United States Patent
Dong (10) Patent No.: US 9,396,118 B2
(45) Date of Patent: Jul. 19, 2016

(54) EFFICIENT DYNAMIC RANDOMIZING ADDRESS REMAPPING FOR PCM CACHING TO IMPROVE ENDURANCE AND ANTI-ATTACK

(75) Inventor: Yaozu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 13/996,487

(22) PCT Filed: Dec. 28, 2011

(86) PCT No.: PCT/CN2011/084798
§ 371 (c)(1),
(2), (4) Date: Jun. 20, 2013

(87) PCT Pub. No.: WO2013/097105
PCT Pub. Date: Jul. 4, 2013

(65) Prior Publication Data
US 2014/0019686 A1    Jan. 16, 2014

(51) Int. Cl.
*G06F 12/00* (2006.01)
*G06F 12/08* (2016.01)
*G06F 12/14* (2006.01)
*G06F 12/10* (2016.01)

(52) U.S. Cl.
CPC ........ *G06F 12/0864* (2013.01); *G06F 12/1408* (2013.01); *G06F 12/10* (2013.01); *G06F 2212/2024* (2013.01)

(58) Field of Classification Search
CPC .. G06F 12/0864; G06F 12/10; G06F 12/1408

USPC .......................... 711/128, 202, 203; 714/758
See application file for complete search history.

(56) References Cited

U.S. PATENT DOCUMENTS

| 5,577,223 | A | 11/1996 | Tanoi et al. |
| 5,912,839 | A | 6/1999 | Ovshinsky et al. |
| 6,622,208 | B2 | 9/2003 | North |
| 6,671,822 | B1 * | 12/2003 | Asher ................ G06F 12/0864 714/6.13 |
| 7,283,397 | B2 * | 10/2007 | Harari et al. ............ 365/185.22 |
| 7,590,820 | B2 | 9/2009 | Dong |

(Continued)

FOREIGN PATENT DOCUMENTS

| CN | 1498369 A | 5/2004 |
| CN | 101620572 | 1/2010 |
| WO | WO-2011065957 | 6/2011 |

OTHER PUBLICATIONS

Notification Concerning Transmittal of the International Preliminary Report on Patentability and Written Opinion in related PCT Application No. PCT/CN2011/084798, mailed Jul. 10, 2014, 6 pages.

(Continued)

*Primary Examiner* — Pierre-Michel Bataille
(74) *Attorney, Agent, or Firm* — Blakely, Sokoloff, Taylor & Zafman LLP (57) ABSTRACT

A method, including monitoring, by a remapping manager, a system state of a computing device for the occurrence of a predefined event, detecting, by the remapping manager, the occurrence of the predefined event, and initiating, by the remapping manager upon the detection of the predefined event, a remapping of first encoded addresses stored in tags, the first encoded addresses are associated with locations in main memory that are cached in a memory cache.

18 Claims, 4 Drawing Sheets

(56) References Cited

U.S. PATENT DOCUMENTS

| | | | |
|---|---|---|---|
| 7,590,918 B2 | 9/2009 | Parkinson | |
| 7,600,078 B1 | 10/2009 | Cen et al. | |
| 7,756,053 B2 | 7/2010 | Thomas et al. | |
| 7,913,147 B2 | 3/2011 | Swaminathan et al. | |
| 8,135,936 B2 | 3/2012 | Schaefer et al. | |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,578,238 B2* | 11/2013 | Priewasser | H03M 13/1105 714/758 |
| 8,605,531 B2 | 12/2013 | Kau et al. | |
| 8,607,089 B2 | 12/2013 | Qawami et al. | |
| 8,612,676 B2 | 12/2013 | Dahlen et al. | |
| 8,612,809 B2 | 12/2013 | Casper et al. | |
| 8,649,212 B2 | 2/2014 | Kau et al. | |
| 8,769,270 B2* | 7/2014 | Orsini | G06F 21/6209 713/165 |
| 8,838,935 B2 | 9/2014 | Hinton | |
| 8,990,505 B1* | 3/2015 | Jamil | G06F 12/08 711/128 |
| 9,026,767 B2 | 5/2015 | Schaefer et al. | |
| 2003/0204702 A1 | 10/2003 | Lomax, Jr. et al. | |
| 2007/0005897 A1* | 1/2007 | Bink | G11C 29/76 711/128 |
| 2007/0005922 A1 | 1/2007 | Swaminathan et al. | |
| 2008/0034148 A1 | 2/2008 | Gower | |
| 2008/0270811 A1 | 10/2008 | Chow et al. | |
| 2009/0240873 A1* | 9/2009 | Yu et al. | 711/103 |
| 2009/0313416 A1 | 12/2009 | Nation | |
| 2010/0095051 A1 | 4/2010 | Chen et al. | |
| 2010/0131827 A1 | 5/2010 | Sokolov | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0072192 A1 | 3/2011 | Sartore | |
| 2011/0153916 A1 | 6/2011 | Chinnaswamy et al. | |
| 2011/0209028 A1* | 8/2011 | Post et al. | 714/758 |
| 2011/0291884 A1 | 12/2011 | Oh et al. | |
| 2013/0055259 A1 | 2/2013 | Dong | |
| 2013/0275682 A1 | 10/2013 | Ramanujan et al. | |
| 2013/0282967 A1 | 10/2013 | Ramanujan | |
| 2013/0290597 A1 | 10/2013 | Faber | |
| 2014/0040550 A1 | 2/2014 | Nale et al. | |
| 2014/0075107 A1 | 3/2014 | Qawami et al. | |

OTHER PUBLICATIONS

Intel Corporation, *PCT International Search Report and Written Opinion* dated Oct. 4, 2012, PCT Appln. No. PCT/CN2011/084798.

Qureshi, Moinuddin K., et al., "Enhancing Lifetime and Security of PCM-Based Main Memory with Start-Gap Wear Leveling", *IBM Research, T.J. Watson Research Center*, Yorktown Heights NY, (Dec. 12, 2009), 10 Pages.

Seong, Nak H., et al., "Security Refresh: Prevent Malicious Wear-out and Increase Durability for Phase-Change Memory with Dynamically Randomized Address Mapping", *School of Electrical and Computer Engineering, Georgia Institute of Technology*, Atlanta, GA, (Jun. 19, 2010), pp. 383-394.

Lee et al., "Architecting Phase Change Memory as a Scalable DRAM Alternaive", ISCA '09, Jun. 20, 2009, 12 pgs., Austin, Texas, USA.

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/ 11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

\* cited by examiner

FIG. 4

EFFICIENT DYNAMIC RANDOMIZING ADDRESS REMAPPING FOR PCM CACHING TO IMPROVE ENDURANCE AND ANTI-ATTACK

CROSS-REFERENCE TO RELATED APPLICATIONS

This patent application is a U.S. National Phase Application under 35 U.S.C. §371 of International Application No. PCT/CN2011/084798, filed Dec. 28, 2011, entitled EFFICIENT DYNAMIC RANDOMIZING ADDRESS REMAPPING FOR PCM CACHING TO IMPROVE ENDURANCE AND ANTI-ATTACK.

FIELD OF THE INVENTION

Embodiments of the invention relate to the field of memory address remapping in a multilevel Non-Volatile Memory (NVM) and Dynamic Random-Access Memory (DRAM) system. More particularly, embodiments of the invention relate to dynamic randomization of memory addresses between a processor and a memory cache.

DESCRIPTION OF THE RELATED ART

Non-Volatile Memory (NVM), such as Phase Change Memory (PCM) or Phase Change Memory and Switch (PCMS), offers higher density and reduced power consumption in comparison to Dynamic Random-Access Memory (DRAM). These benefits have prompted some to propose using NVM as a replacement to DRAM for main memory in personal computing devices. Although NVM offers several advantages over traditional DRAM, many NVM technologies suffer from poor write endurance issues that can cause NVM to have a greatly reduced lifespan. In an attempt to utilize the benefits of each memory technology, a two-level memory hierarchy has been proposed where NVM is used as main memory while DRAM is used as a cache for the NVM to reduce the frequency of writes to NVM and therefore improve the endurance of NVM. Additionally, address indirection can be used between the DRAM and NVM to provide wear leveling and improve the lifespan of NVM. This hybrid NVM and DRAM architecture provides high memory density while mitigating the poor write endurance issues inherent in NVM.

Although address indirection between DRAM and NVM provide wear leveling when malicious software attacks occur that repeatedly write to selected NVM addresses improves the write endurance of PCM, malicious software attacks that force the DRAM to flush to the NVM can exhaust the endurance of NVM cells and cause NVM to fail. Thus, improving the vulnerability of NVM to malicious software attacks is an important issue to the proliferation of NVM as a viable main memory alternative for computing devices including desktop computers, servers, laptop computers, wireless handsets, cell phones, tablet computers, personal digital assistants, etc.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, the various embodiments of the invention will be described in detail. However, such details are included to facilitate understanding of the embodiments of the invention and to describe exemplary embodiments for employing the embodiments of the invention. Such details should not be used to limit the embodiments of the invention to the particular embodiments described because other variations and embodiments are possible while staying within the scope of the embodiments of the invention. Furthermore, although numerous details are set forth in order to provide a thorough understanding of the embodiments of the invention, it will be apparent to one skilled in the art that these specific details are not required in order to practice the embodiments of the invention.

In the following description, particular components, circuits, state diagrams, software modules, systems, timings, etc. are described for purposes of illustration. It will be appreciated, however, that other embodiments are applicable to other types of components, circuits, state diagrams, software modules, systems, and/or timings, for example.

Figure 1:
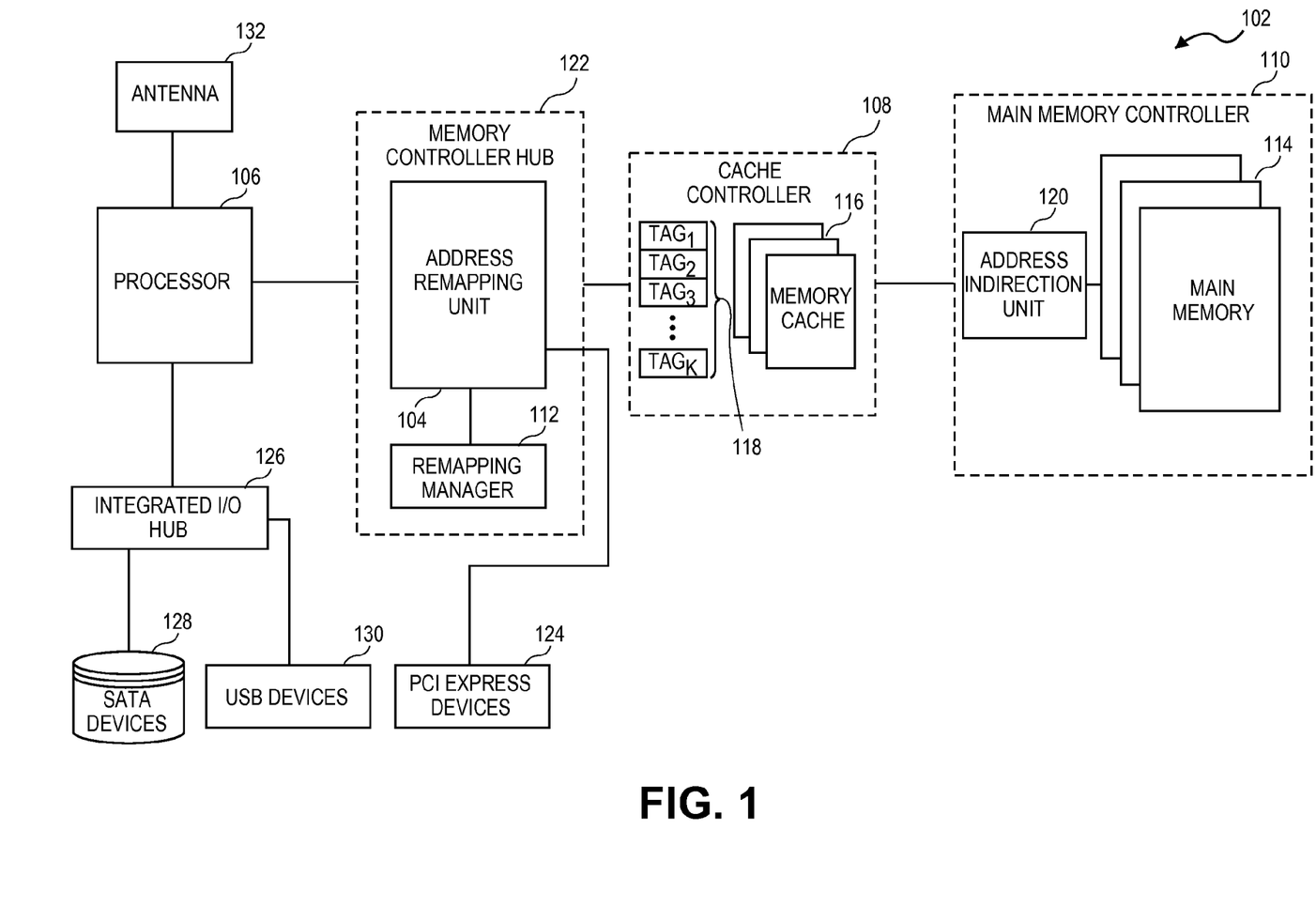
FIG. 1 is a diagram of a computing device including an address remapping unit according to one embodiment of the invention.

FIG. 1 is a diagram of a computing device 102 including an address remapping unit 104 according to one embodiment of the invention. The computing device 102 includes a processor 106, a cache controller 108, a main memory controller 110, a remapping manager 112, and the address remapping unit 104. The address remapping unit 104 can be coupled to the processor 106 through any type of bus or specialized communication medium. In one embodiment, the address remapping unit 104 and the processor 106 are part of a shared integrated circuit or system on a chip (SoC) and are in direct communication with one another. In other embodiments, the address remapping unit 104 can be separated from the processor 106 by any number of intermediate components, buses or communication mediums. In further embodiments, the processor 106 can be in communication with other types of processing units. One skilled in the art would understand that the illustrated system is provided by way of example and not by limitation, that the structures, techniques and features described herein are applicable to other architectures or components.

The processor 106 is an integrated circuit that executes the instructions of one or more computer programs, to perform the basic arithmetical, logical, and input/output operations of the computing device 102. The processor 106 may have one or more cores that can process multiple programs simultaneously using the multi-level memory system described herein. In some embodiments, the processor 106 can be a comprised of multiple processing units or processor dies coupled to the computing device 102 through multiple sockets.

In one embodiment, the computing device 102 may include an integrated I/O hub 126. The integrated I/O hub 126 can provide an interface for certain types of peripheral devices such as SATA devices 128 and universal serial bus (USB) ports and devices 130. In other embodiments, the integrated I/O hub 126 can communicate with peripheral devices over a PCI express bus or similar configuration. SATA devices 128 can include such devices as solid-state storage devices, flash drives, magnetic storage devices such as hard disks and similar storage devices. USB ports and devices 130 can include ports for a basic computer system to attach to external devices such as mice, keyboards, cameras and similar devices.

In some embodiments, the computing device 102 may include an antenna 132 coupled to the processor 106. The antenna 132 is capable of receiving wireless signals from one or more wireless providers or sources. The wireless signals include long-range communication signals such as those provided by cellular networks (e.g. Code division multiple access (CDMA), Global System for Mobile Communications (GSM), 3GPP Long Term Evolution (LTE), etc.) and those provided by smaller data networks (e.g. IEEE 802.11 (Wi-Fi), IEEE 802.16 (WiMAX), HiperLan, etc.). In one embodiment, the antenna 132 may be comprised of multiple antennas.

The address remapping unit 104 receives data read and write requests from the processor 106 intended for the cache controller 108. The requests include a physical address associated with a location in main memory 114 where the requested data is located. The physical address can be the actual address in the main memory 114 were the data is located or it can be an address that is translated by the main memory controller 110 to the actual address in the main memory 114. In some embodiments, the physical address can include a set address corresponding to a set of locations in the memory cache 116 where the data corresponding to the physical address is being cached. In other embodiments, the set address is separate from the physical address.

The address remapping unit 104 provides address encryption and mapping services between data read and write requests from the processor 106 and the cache controller 108. The address encryption and mapping services of the address remapping unit 104 provide address randomization to obfuscate the physical addresses in the main memory 114 and/or the main memory controller 110 from software running on the processor 106 or the PCI express devices 124. In one embodiment, the address remapping unit 104 and the remapping manager 112 can be located within a memory controller hub 122. The memory controller hub 122 provides an interface between the cache controller 108 and PCI express devices 124 and the processor 106. The memory controller hub 122 can communicate with the cache controller 116 and the processor 106 over a memory bus and communicate with the PCI express devices 124 over a bus such as a PCI express bus or similar communication mechanism. In some embodiments, the computing device 102 can include multiple memory controller hubs 122, such as one or multiple memory controller hubs 122 per socket.

The cache controller 108 manages the memory cache 116 with the assistance of tags 118 associated with each line of memory (i.e. cache memory lines) in the memory cache 116. The tags 118 indicate what pieces of data from the main memory 114 are stored in each cache line. The tags 118 can include an additional "Young" bit indicating the age of the address associated with a cache line in the memory cache 116 and stored in the tags 118. For example, the Young bit can indicate if the address is encoded using an old keyset.

In one embodiment, the tags 118 store addresses corresponding to physical addresses in the main memory 114 that are cached in the memory cache 116. In some embodiments, the tags 112 can also store a set address corresponding to a set of locations in the memory cache 116 where the data corresponding to the physical address is being cached. The addresses stored in the tags 118 can be identical to addresses in the main memory or they can be encoded and be mapped to locations in the main memory 114. In one embodiment, the addresses stored in the tags 118 are encoded/encrypted versions of physical addresses in the main memory 114. Malicious programs may attempt to destroy segments of the main memory 114 by repeatedly causing writes to these locations in main memory. After repeated writes, segments of main memory mediums with poor write endurance will fail. By obscuring the actual physical addresses of data in the main memory 114 that are cached in the memory cache 116, it becomes more challenging for malicious programs to repeatedly write to selected locations in the main memory 114 and thereby destroy segments of a main memory medium with poor write endurance.

The memory cache 116 and the main memory 114 are digital memory mediums that store data and instructions for access by the processor 106. The memory cache 116 can be a direct mapped cache, a fully associative cache, an n-way set associative cache, an n-way skewed associative cache, or any other similar type of cache. The mapping of addresses to locations in the memory cache 116 may be implementation specific such that for a given address, the function F (address) returns a set address corresponding to the possible locations in the memory cache 116 where data associated with the address can be stored.

The memory cache 116 can be a memory medium with lower memory density than the main memory 114, but with greater write endurance, and/or performance. For example, the memory cache 116 can be Dynamic Random-Access Memory (DRAM) or embedded DRAM (eDRAM) while the main memory 114 can be Phase Change Memory (PCM), Flash Memory, or any Non-Volatile Memory (NVM). In one embodiment, the main memory 114 is Phase Change Memory and Switch (PCMS). PCMS includes one PCM element layered with Ovonic Threshold Switch (OTS) in a cross point array. Once integrated together and embedded in a cross point array, layered arrays are combined with CMOS circuits for decoding, sensing and logic functions. The ability to layer or stack arrays of PCMS provides the scalability to higher memory densities while maintaining the performance characteristics of PCM. In other embodiments, other non-volatile memories can be used for the main memory 114.

In one embodiment, the main memory 114 is comprised of Ferroelectric Transistor Random Access Memory (Fe-TRAMS). FeTRAMS are formed by combining silicon nanowires with a ferroelectric polymer. FeTRAMS store information by reading the changing polarity of ferroelectric transistors as a binary value. This binary reading technique allows for nondestructive readout. In another embodiment, the main memory 114 is comprised of nanowire based memory modules. Nanowire memory is formed from silicon shaped into tiny wires that are approximately 20 nanometers in diameter. These silicon nanowires are each surrounded by a stack of thin layers of material called dielectrics, which store electrical charge. Each stack holds its stated when electrical charge is no longer applied.

The cache controller 108 can receive data requests from the remapping unit 104 that originated from the processor 106 or PCI express devices 124 and processes the requests. The requests include an address associated with a location in the main memory 114 where the data is held. The cache controller 108 polls the tags 118 to determine if the requested data has been previously cached in the memory cache 116 (a "hit") or if the data needs to retrieved from the main memory 114 (a "miss"). The determination of a hit or a miss can be performed by comparing the memory address included in a data request with the addresses stored in each of the tags 118. In other embodiments involving an n-way set associative memory cache 116, the determination of a hit or a miss can be performed by comparing the memory address included in a data request with the addresses stored in only the tags 118 in the set associative group of the address. In one embodiment, this comparison includes comparing a set address of the memory address included in the data request with set addresses associated with each address stored in the tags 118. A comparison that reveals a match with one of the addresses stored in the tags 118 indicates a hit while failure to match with a tag 118 indicates a miss.

The main memory controller 110 manages the main memory 114 by controlling read and write operations. In one embodiment, the main memory controller 110 returns a data value stored at a location in the main memory 114 in response to a request for the data from the cache controller 108. The main memory controller 110 can also write a data value to a location in the main memory 114 in response to a location in the memory cache 116 being flushed to the main memory 114. In one embodiment, the main memory controller 110 includes an address indirection unit 120 for controlling wear levels of memory cells/locations in the main memory 114. In one embodiment, the address indirection unit 120 can implement the Start-Gap Wear Leveling system.

Figure 2:
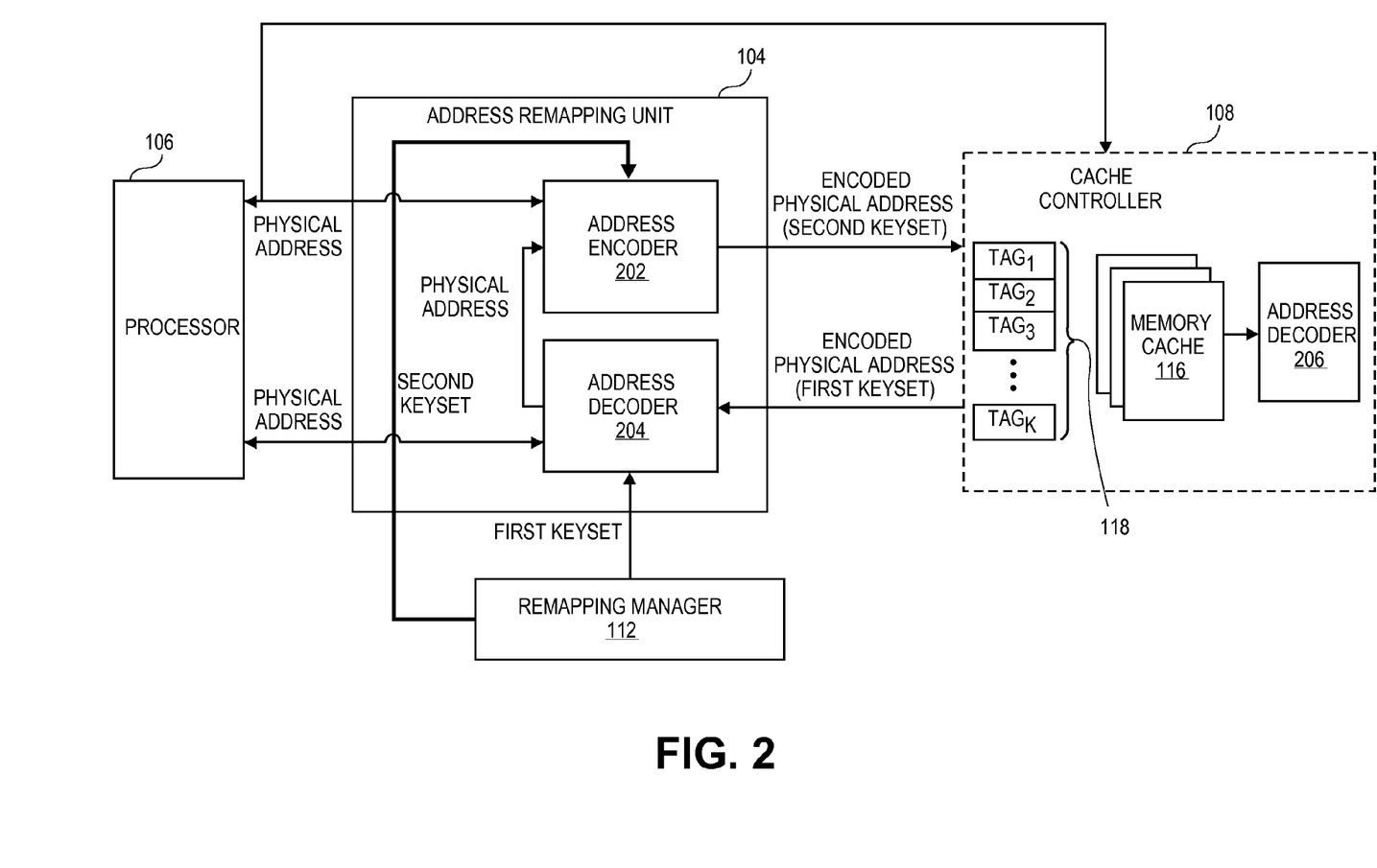
FIG. 2 is a component diagram of the address remapping unit according to one embodiment of the invention.

FIG. 2 is a component diagram of the address remapping unit 104 according to one embodiment of the invention. The address remapping unit 104 can include an address encoder 202 and an address decoder 204. The address encoder 202 receives a physical address from either the processor 106, the PCI express devices 124, or the address decoder 204 and encodes the physical address to generate an encoded address. Conversely, the address decoder 204 receives an encoded address from the cache controller 108 and decodes the encoded address to generate a physical address.

The encoding performed by the address encoder 202 can be implemented using a block or similar cipher algorithm. For example, a Feistel network cipher, a Data Encryption Standard (DES) cipher, a multi-level DES cipher, or an Advanced Encryption Standard (AES) class cipher can be used by the address encoder 202 to encode physical addresses. The decoding performed by the address decoder 204 can be performed using an algorithm inverse or the reverse of the algorithm used by the address encoder 202 to perform encoding. In one embodiment, the remapping manager 112 provides a first keyset to the address encoder 202 and a second keyset to the address decoder 204 for use by the encoding algorithm and the decoding algorithm, respectively. In one embodiment, the keyset provided to the address decoder 204 is in reverse order to the keyset provided to the address encoder 202. This relationship in keysets is based on an inverse/reverse relationship between corresponding encoding and decoding algorithms. In another embodiment, the keysets are entirely different and do not share an inverse relationship. For example, the keysets provided to the address encoder 202 and the address decoder 204 can be different during a remapping operation, which will be described in further detail below.

The encoded address from the address encoder 202 can be used to locate the address of a cache line to relocate the cache line's position in the memory cache 116.

In one embodiment, the tag 118 of the cache line may include a whole or a partial original physical address from the processor 106 and/or the PCI express devices 124. Both the original address and the encoded address may be used to perform a cache lookup. In this embodiment, the memory controller 108 may retrieve the original physical address from the set address and the tags 118, to access the main memory 114.

In other embodiments, a tag 118 of a cache line may include the whole or a partially encoded address and use data stored in the tag 118, including its location address (i.e. set address), to perform a cache lookup. The memory controller 108 can use an additional address decoder 206 to decode the address from the encoded address to an original physical address or any intermediate address. This process bypasses the address encoder 202 and the address decoder 204 and uses the decoded address to access the main memory 110 directly. In one embodiment, the decoder 206 takes the same decoding algorithm and keyset as the address decoder 204 to access main memory 110 with the original physical address. In one embodiment, the address decoder 206 can be a separate component while in another embodiment the address decoder 206 can be the same component as the address decoder 204.

Figure 3A:
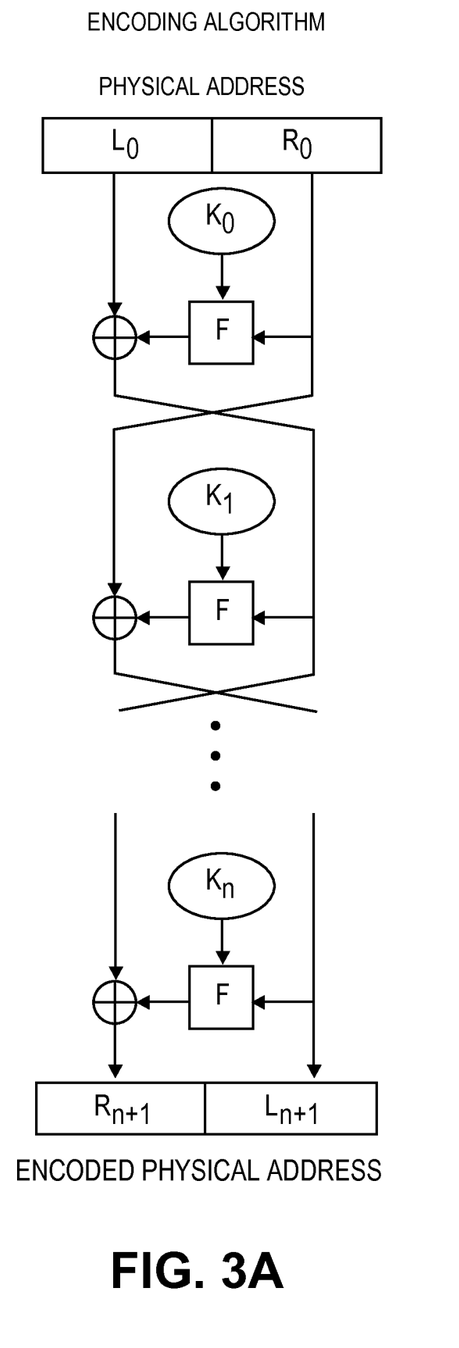
FIG. 3A is a flow diagram of an encoding algorithm that can be used by an address encoder to generate the encoded address based on a physical address according to one embodiment of the invention.

As shown in FIG. 2, the address encoder 202 encodes a physical address received from either the processor 106 or the address decoder 204 to generate an encoded address using the keyset provided by the remapping manager 112 and an encoding algorithm. FIG. 3A is a flow diagram of an encoding algorithm that can be used by the address encoder 202 to generate the encoded address based on a physical address according to one embodiment of the invention. In this embodiment, the encoding algorithm is an n-stage Feistel Network cipher. The n-stage Feistel Network cipher begins with the splitting of the physical address into two equal pieces: $L_0$ and $R_0$. As noted above, the address encoder 202 receives a keyset from the remapping manager 112. The keyset can be defined as $(K_1, K_2, \ldots K_i)$. For each round i=1, 2, ..., n, where n is a positive integer, $$L_{i+1} = R_i$$

$$R_{i+1} = L_i \oplus F(R_i, K_i)$$

$$F(R_i, K_i) = (R_i \oplus K_i)_2$$

After the completion of the nth stage of the Feistel Network, the ciphertext (e.g. the encoded address) is the concatenation of $R_n$ and $L_n$.

Figure 3B:
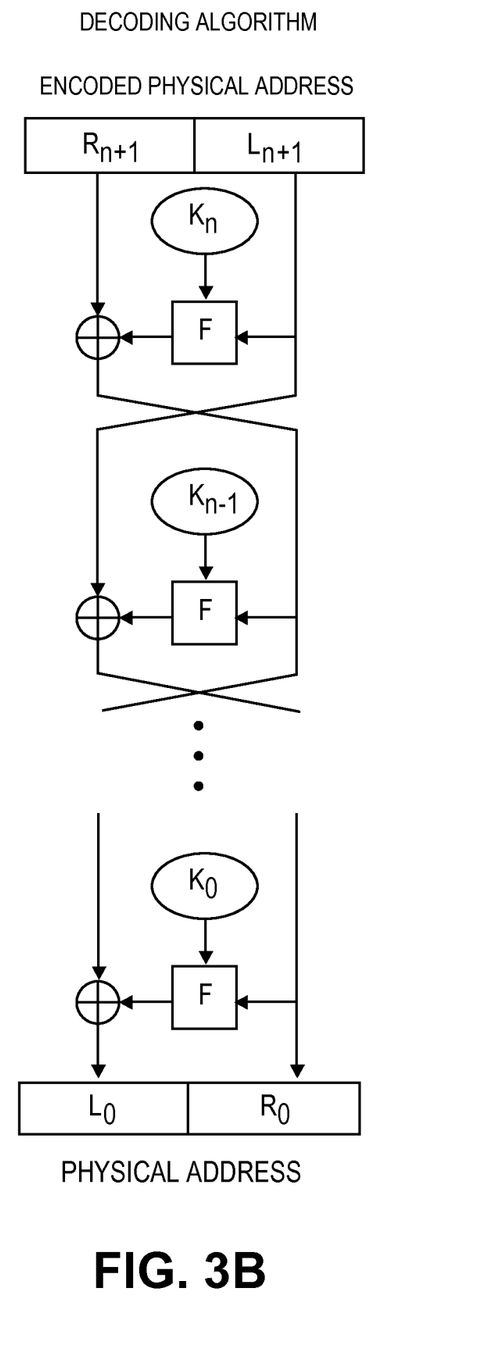
FIG. 3B is a flow diagram of a decoding algorithm that can be used by an address decoder to generate a physical address based on an encoded address according to one embodiment of the invention.

As shown in FIG. 2, the address decoder 204 can decode an encoded address received from the cache controller 108 from one of the tags 118 to generate a physical address using a keyset provided by the remapping manager 112. FIG. 3B is a flow diagram of a decoding algorithm that can be used by the address decoder 204 to generate a physical address based on an encoded address according to one embodiment of the invention. In this embodiment, the decoding algorithm is an n-stage Feistel Network cipher. In this embodiment, the decoding algorithm is similar to the encoding algorithm used by the address encoder 202 with the exception that the keyset used by the decoding algorithm is the reverse of the keyset used by the encoding algorithm. Namely, if the keyset used by the encoding algorithm is $(K_1, K_2, \ldots K_i)$, the keyset used by the decoding algorithm is $(K_i, K_{i-1}, \ldots K_1)$. After the completion of the nth stage of the Feistel Network, the concatenation of $R_n$ and $L_n$ is the physical address.

As described above, the remapping manager 112 provides keysets for use by the address encoder 202 and the address decoder 204. The keysets can be generated by the remapping manager 112 using a random number generator such as the generators provided by the Intel 810/815/840/845G chipsets or Intel's RdRand instruction or by using a pseudorandom number generator such as a Lagged Fibonacci generator or a Linear Congruential generator.

In one embodiment, the remapping manager 112 can initiate re-encoding/re-mapping of all the addresses stored in the tags 118, based on a new keyset. In this embodiment, the remapping manager 112 monitors one or more system states for the occurrence of a predefined event. The monitoring for a predefined event can be performed at a static interval (e.g. every 5 seconds) or can be varied by the remapping manager 112 or operating system. The predefined event can be, for example, the passage of a period of time since the last remapping, an average age of data in the memory cache 116 exceeds a limit, and a request from an application to perform remapping.

In one embodiment, the remapping manager 112 initiates re-encoding/re-mapping of all the addresses stored in the tags 118 by sending a message to both the address encoder 202 and the address decoder 204. In one embodiment, the message sent to the address decoder 204 to initiate re-encoding/re-mapping includes the old keyset used to encode all physical addresses in the tags 118. In this embodiment, the message sent to the address encoder 202 to initiate re-encoding/re-mapping includes a new keyset that will be used to encode the physical addresses.

Figure 4:
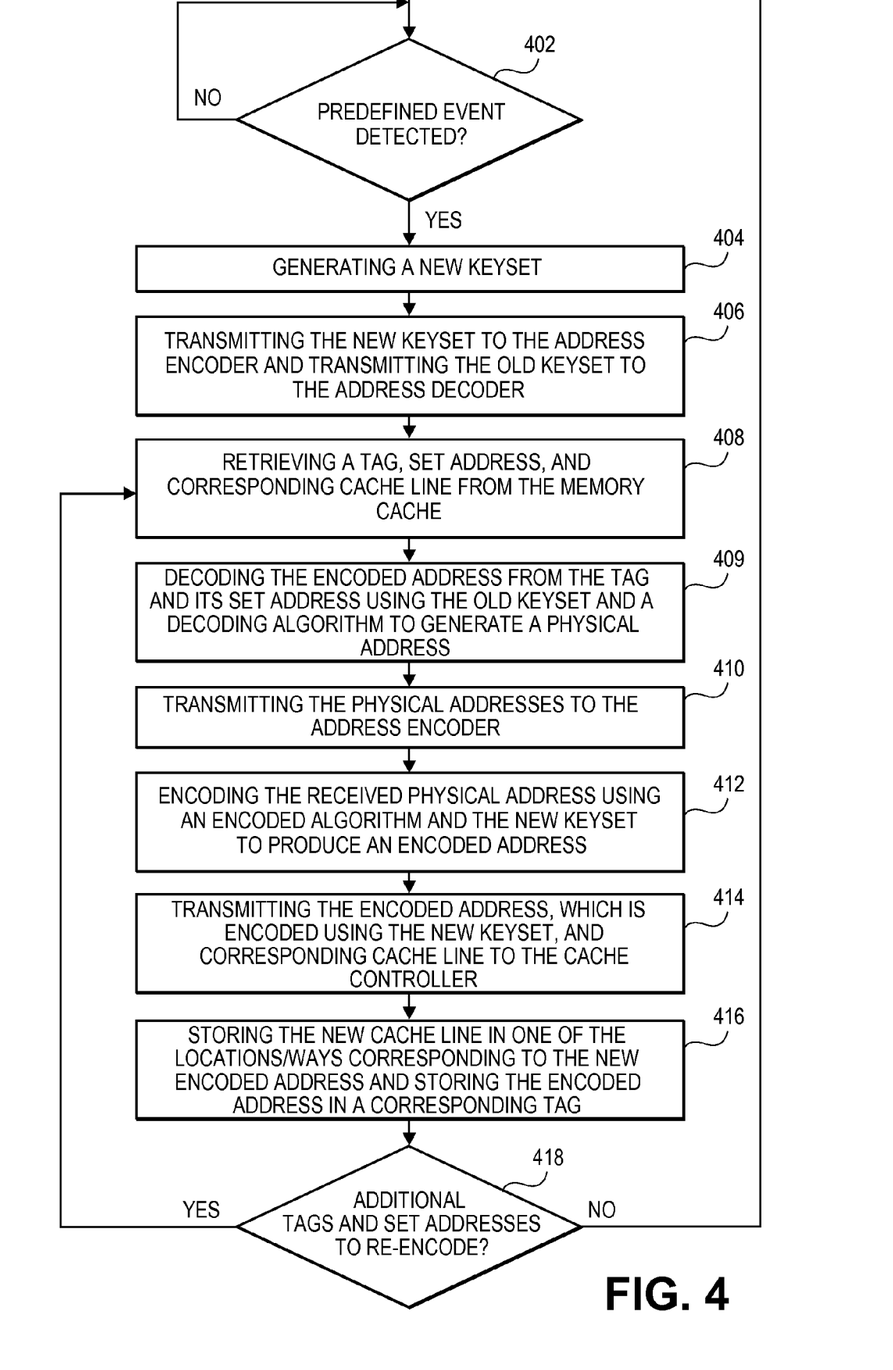
FIG. 4 shows a method for remapping addresses stored in tags of a memory cache according to one embodiment of the invention.

FIG. 4 shows a method for remapping addresses stored in the tags 118 according to one embodiment of the invention. Operations of this method can be performed by one or more elements described above and shown in FIGS. 1-3. In the embodiment shown in FIG. 4, the addresses currently stored in the tags 118 are encrypted/encoded using an old keyset. The memory cache 116 in this embodiment is a direct mapped cache, a fully associative cache, an n-way set associative cache, an n-way skewed associative cache, or any other similar type of cache. 114.

The method begins at operation 402 with the remapping manager 112 monitoring a set of system and memory states, conditions, or variables for the occurrence of a predefined event. As described above, the predefined event can be, for example, the passage of a period of time since the last remapping, an average age of data in the memory cache 116 exceeds a limit, and a request from an application to perform remapping.

Upon detection of a predefined event, the remapping manager 112 generates a new keyset at operation 404. As described above, the new keyset can be generated using a true random number generator or a pseudorandom number generator. In one embodiment, the new keyset is a set of random integer values that is distinct and unrelated to the old keyset. In other embodiments, the new keyset is partially derived from the old keyset.

At operation 406, the remapping manager 112 transmits the new keyset to the address encoder 202 and transmits the old keyset to the address decoder 204. The transmission can be performed over a general data bus coupling the remapping manager 112 to the address encoder 202 and the address decoder 204. In another embodiment, the remapping manager 112, the address encoder 202 and the address decoder 204 are part of a shared integrated circuit or system on a chip (SoC) and are in direct communication with one another.

At operation 408, the address decoder 204 retrieves one cache line and corresponding tag 118 from the cache controller 108. In one embodiment, the cache line and the tag 118 may be buffered inside the remapping manager 112, and the original cache line may be marked as unused by setting an INVALID bit. The tag 118 includes an encoded address that has been encoded using the old keyset. The encoded address is associated with a first set of locations/ways in the n-way set associative memory cache 116. The set of locations (i.e. the set address) are the locations in the memory cache 116 that the corresponding cache line can be stored. As previously explained, this associativity can be determined for each encoded address in the tags 118 by an implementation specific function.

At operation 409, the address decoder 204 decodes the encoded address from the tag 118 and its set address using the old keyset and a decoding algorithm to generate a physical address. The physical address is associated to a location of data in the main memory 114 that is cached by the memory cache 116. In one embodiment, the retrieved cache line may be stored in a buffer of the remapping manager 112 while the encoded address/physical address is processed by the address remapping unit 104.

At operation 410, the address decoder 204 transmits the physical address to the address encoder 202. The transmission can be performed over a general data bus coupling the address encoder 202 to the address decoder 204. In another embodiment, the address encoder 202 and the address decoder 204 are part of a shared integrated circuit or system on a chip (SoC) and are in direct communication with one another.

At operation 412, the address encoder 202 encodes the received physical address using an encoding algorithm and the new keyset to produce a new encoded address. This new encoded address is associated with a second set of locations/ways (i.e. set address) in the n-way set associative memory cache 116 that may be different from the first set of locations/ways associated with the old encoded address.

At operation 414, the address encoder 202 transmits the cache line and the new encoded address to the cache controller 108. The transmission can be performed over a general data bus coupling the address encoder 202 and the cache controller 108 or through a direct communication channel.

At operation 416, the cache controller 108 stores the new cache line in one of the locations/ways in the second set of locations/ways corresponding to the new encoded address and the new encoded address is stored in a corresponding tag 118. In one embodiment, the Young bit of the stored new cache line and/or tag 118 can be toggled to indicate an updated age. In one embodiment, the new cache line may be placed in an unused cache line. In another embodiment, storage of the new cache line requires the flushing of another cache line to the main memory 114 and the newly freed space is used to store the new cache line. In another embodiment, the current cache line is flushed to the main memory 114 if there is no room in the second set of locations/ways. In still another embodiment, storage of the new cache line requires the remapping manager 112 to load an old cache line decoded with old keyset into an internal buffer. In this embodiment, the method goes back to operation 408 to process the buffered cache line.

At operation 418, a determination is made if there are additional cache lines and tags 118 to re-encode using the new keyset. This determination can be made using the Young bit associated with each cache line and tag 118 that indicates the cache line's age and/or whether an encoded address associated with the cache line and tag 118 is encoded with a new or old keyset. Upon a determination that there are additional cache lines to re-encode using the new keyset, control returns to operation 408 to process the next cache line.

Upon a determination that all cache lines and tags 118 have been re-encoded using the new keyset, the method returns control to operation 402 to monitor for the occurrence of another predefined event. In one embodiment, the keyset of the address decoder 206 may be updated with the new keyset. In another embodiment, after returning control to operation 402, the remapping manager 112 can discard the old keyset as the tags 118 are no longer encoded with this keyset. In both embodiments, the new keyset becomes the old keyset.

By remapping/re-encoding the addresses in the tags 118 of the memory cache 116, each corresponding cache line may be re-associated and stored in a new set of locations in the memory cache 116. Each set can have multiple ways/locations to hold the cache line without requiring a flush to the main memory 114. Therefore, the memory cache flush frequency and main memory write frequency are greatly reduced. In embodiments where the main memory has poor write endurance, the lifespan of the main memory can be lengthened even in when attacked by malicious software.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
in a computing system comprising a multi-level system memory having a first memory cache level and a second non volatile main memory level:
monitoring a system state of a computing device for the occurrence of a predefined event;
detecting the occurrence of the predefined event; and
initiating, by a remapping manager in response to the detection of the predefined event, a remapping of physical addresses to encoded tags from a first encoding scheme to a second encoding scheme, wherein, an encoded tag is kept in the first memory cache level along with a corresponding cache line to identify where the cache line is kept in the second non volatile main memory level, wherein the initiating of the remapping further comprises reconfiguring an address encoder to use the second encoding scheme for subsequent addresses yet to be encoded into a tag and stored in the first memory cache level and reconfiguring an address decoder to use the first encoding scheme for subsequent encoded tags yet to be received from the first memory cache level and decoded into a physical address.

2. The method of claim 1, wherein the reconfiguring of the address encoder further comprises: generating a new keyset for use by the address encoder to implement the second encoding scheme; and transmitting the new keyset to the address encoder.

3. The method of claim 2, wherein the remapping further comprises:
decoding into a physical address, by the address decoder, an encoded tag using an old keyset that was used by the address encoder during the first encoding scheme.

4. The method of claim 3, further comprising: providing the decoded physical address to the address encoder for encoding.

5. The method of claim 1, wherein the predefined event is one of the passage of a period of time since a last remapping was initiated, an average age of data in the memory cache exceeds a time period, and a request from an application to perform remapping.

6. The method of claim 1 wherein the tag includes information indicating an age of the cache line's address.

7. The method of claim 1, wherein the second non volatile memory level is comprised of any of:
a phase change memory;
a ferroelectric memory.

8. A system, comprising:
a processor;
a multi level system memory, coupled to the processor, the multi-level system memory comprising a first memory cache level to cache data stored in a second non volatile memory level, wherein the first memory cache level is to keep cache lines and associated encoded tags, the associated encoded tags to identify where their associated cache lines are kept in the second non volatile memory;
an address remapping unit to encode the cache lines' physical addresses into the encoded tags; and,
a remapping manager to initiate remapping of the cache lines' physical addresses into the encoded tags by changing the tag encoding scheme applied by the address remapping unit from a first encoding scheme to a second encoding scheme, wherein, the changing of the tag encoding scheme further comprises reconfiguring an address encoder to use the second encoding scheme for subsequent addresses yet to be encoded into a tag and stored in the first memory cache level and reconfiguring an address decoder to use the first encoding scheme for subsequent encoded tags yet to be received from the first memory cache level and decoded into a physical address.

9. The system of claim 8, wherein the remapping manager is to initiate remapping in response to the occurrence of a predefined event.

10. The system of claim 9, wherein the predefined event is one of the passage of a period of time since the last remapping was initiated, average age of data in the first memory cache level exceeds a time period, and a request from an application to perform remapping.

11. The system of claim 8, further comprising: a cache controller to control the first memory cache level.

12. The system of claim 8, wherein the changing of the tag encoding scheme includes replacing an old keyset with a new keyset.

13. An apparatus, comprising:
a memory controller comprising:
an interface to a first memory cache level of a multi-level system memory comprising the first memory cache level and a second non volatile memory level;
an address encoder to encode a physical address of a cache line into an encoded tag, the encoded tag kept in the first memory cache level along with the cache line to identify where the cache line is kept in the second non volatile memory;
an address decoder to decode the encoded tag into a physical address where the cache line is kept in the second non volatile memory level;
wherein the address encoder and address decoder are to concurrently change their respective encoding and decoding mapping schemes, and, wherein, as part of the concurrent change, the address decoder adopts the mapping scheme that the encoder is to concurrently change from.

14. The apparatus of claim 13, wherein the address encoder is to perform encoding using a first block cipher and the memory controller further comprises an address decoder to perform received encoded tag decoding using a second block cipher, wherein the second block cipher is the reverse of the first block cipher.

15. The apparatus of claim 14, wherein the memory controller further comprises a remapping manager to change the encoding scheme used by the address encoder, the remapping manager coupled to the address encoder to provide a new keyset to the address encoder, an old keyset to be provided to the address decoder as part of the change in response to a predefined event.

16. The apparatus of claim 15, wherein the predefined event is one of the passage of a period of time since the last transmission of a new keyset to the address encoder, an average age of data in the first memory cache level exceeds a time period, and a request from an application to perform remapping.

17. The apparatus of claim 13, wherein information describing an age of the cache line's address is kept along with the tag in the first memory cache level.

18. The apparatus of claim 13, wherein an encoding algorithm employed by the encoder is one of a Feistel Network cipher, a Data Encryption Standard cipher, a multi-level Data Encryption Standard cipher, and an Advanced Encryption Standard cipher.

* * * * *